US012715236B2

(12) United States Patent
Steeves

(10) Patent No.: US 12,715,236 B2
(45) Date of Patent: Aug. 25, 2026

(54) INTERCHANGEABLE STENCIL SET

(71) Applicant: Brett Steeves, Maple Ridge (CA)

(72) Inventor: Brett Steeves, Maple Ridge (CA)

( * ) Notice: Subject to any disclaimer, the term of this patent is extended or adjusted under 35 U.S.C. 154(b) by 157 days.

(21) Appl. No.: 18/893,731

(22) Filed: Sep. 23, 2024

(65) Prior Publication Data

US 2025/0100322 A1 Mar. 27, 2025

(51) Int. Cl.
*B44D 2/00* (2006.01)

(52) U.S. Cl.
CPC .................................... *B44D 2/007* (2013.01)

(58) Field of Classification Search
CPC ................................ G09B 11/04; B44D 2/007
See application file for complete search history.

(56) References Cited

U.S. PATENT DOCUMENTS 6,579,099 B1 * 6/2003 Pipes, Jr. ............... G09B 11/04 33/1 K
10,458,132 B1 * 10/2019 Green ................. E04G 21/1825

* cited by examiner

*Primary Examiner* — Jerry-Daryl Fletcher
(74) *Attorney, Agent, or Firm* — Oyen Wiggs Green & Mutala LLP

(57) ABSTRACT

A stencil assembly includes a handle, a clamp assembly, and one or more stencil attachments. The clamp assembly extends from the handle and includes first and second clamp members. The first clamp member includes a first clamp surface, and the second clamp member includes a second clamp surface. The stencil attachments include an attachment member that removably engages with the clamp assembly and a stencil design extending from the attachment member. One or both of the first and second clamp surfaces includes grooves. The first and second clamp members are biased to each other in a closed configuration such that the first and second clamp surfaces engage with each other. In the closed configuration, the grooves define, at least in part, channels for removably engaging with the one or more stencil attachments.

10 Claims, 5 Drawing Sheets

INTERCHANGEABLE STENCIL SET

CROSS-REFERENCE TO RELATED APPLICATIONS

This application claims priority from Canadian Patent Application No. 3,213,999 filed 22 Sep. 2023, the contents of which are hereby incorporated by reference.

TECHNICAL FIELD

The present disclosure relates to stencils, and in particular, the present disclosure relates to stencil sets used for painting designs on structures or vehicles.

BACKGROUND

Stencils are commonly used when a design or pattern is desired to be painted onto an item or structure. For example, if a certain design is to be painted on an item, this may be accomplished by attaching a stencil (containing a cut-out outline of the design) to the item and then applying paint onto the stencil. The cut-out portions of the stencil will allow paint to be transferred to the item, while the remainder of the stencil will prevent the transfer of paint, thus allowing the design to be painted, or applied, onto the item.

However, it is tedious and time-consuming to be continually attaching and removing the stencil from the item when the design is to be applied at multiple locations on the item or when the item is relatively large (compared to the stencil).

Therefore, there is a need for a stencil system that allows for convenient application of multiple designs or patterns on an item or structure. These and other objects will be better understood by reference to the description which follows.

SUMMARY

In accordance with one embodiment, a stencil assembly comprises a handle, a clamp assembly, and one or more stencil attachments. The clamp assembly extends from the handle and comprises first and second clamp members. The first clamp member comprises a first clamp surface, and the second clamp member comprises a second clamp surface. The one or more stencil attachments comprise an attachment member adapted to removably engage with the clamp assembly and a stencil design extending from the attachment member. One or both of the first and second clamp surfaces comprise grooves. The first and second clamp members are biased to each other in a closed configuration such that the first and second clamp surfaces engage with each other. In the closed configuration, the grooves define, at least in part, channels for removably engaging with the one or more stencil attachments.

In another embodiment, the clamp assembly further comprises first and second portions. The first portion comprises a first clamp handle and the first clamp member. The second portion comprises a second clamp handle and the second clamp portion.

In still another embodiment, the first clamp handle is connected to the handle.

In still yet another embodiment, the first and second portions are pivotally connected.

In a further embodiment, the clamp assembly further comprises a spring for biasing the first and second clamp members to each other.

In still a further embodiment, the first clamp surface comprises a first leading edge and the second clamp surface comprises a second leading edge. The grooves extend from one or both of the first and second leading edges.

In still yet a further embodiment, one or both of the first and second clamp surfaces comprise groove side walls extending from one or both of the first and second leading edges, and wherein the groove side walls define at least a portion of one or more of the grooves.

In another embodiment, one or more of the grooves comprise a cutout portion. At least a portion of the cutout portion having a width greater than a distance between the groove side walls.

In still another embodiment, compression of the spring causes the first and second clamp surfaces to disengage from each other.

In still yet another embodiment, the compression of the spring is effected by pressing on the second clamp handle.

The foregoing was intended as a summary only and of only some of the aspects. It was not intended to define the limits or requirements of the invention. Other aspects of the invention will be appreciated by reference to the detailed description of the preferred embodiments. Moreover, this summary should be read as though the claims were incorporated herein for completeness.

BRIEF DESCRIPTION OF THE DRAWINGS

The invention will be described by reference to the detailed description and to the drawings thereof in which.

DETAILED DESCRIPTION

Figure 1:
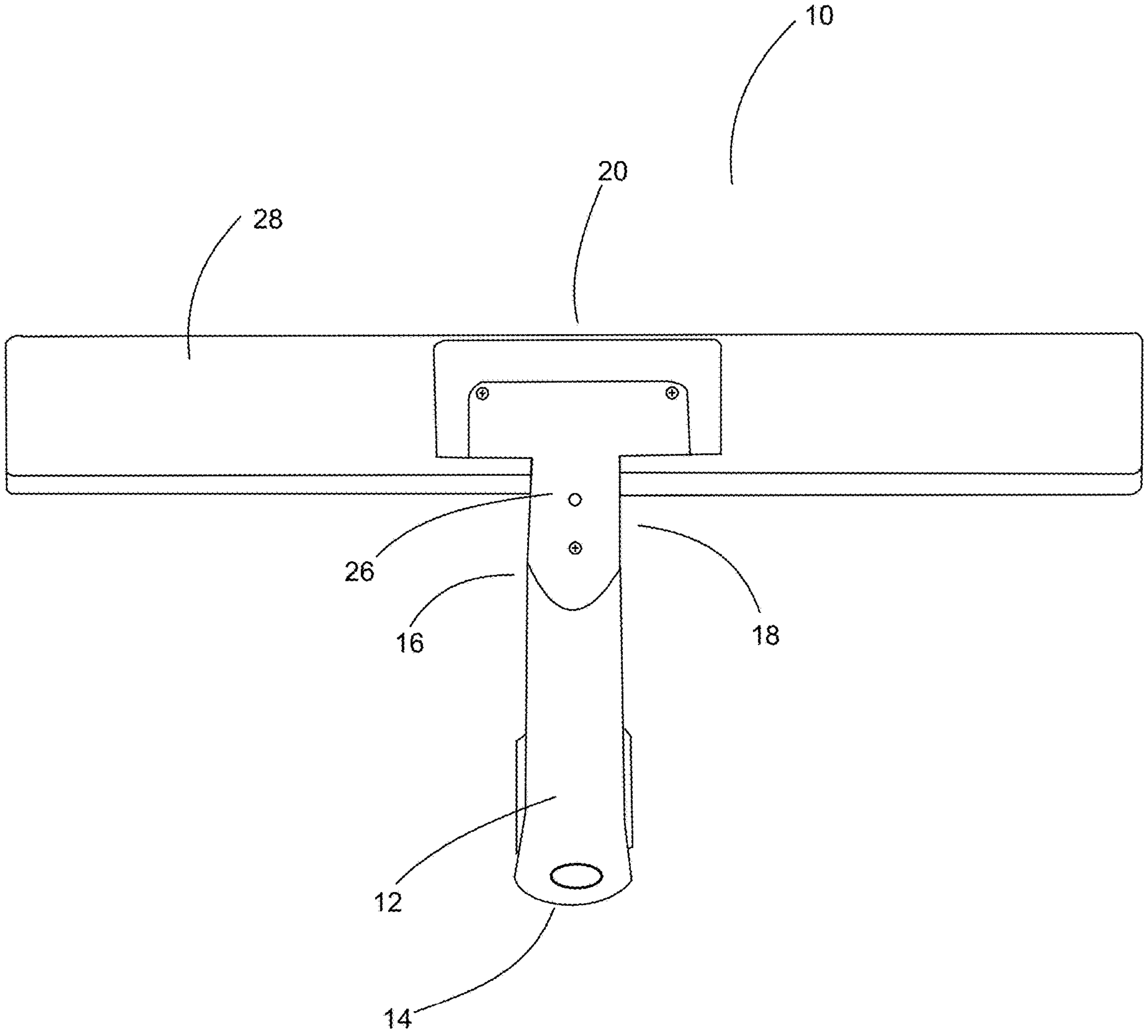
FIG. 1 is a top view of the stencil assembly in accordance with one embodiment.
Figure 2:
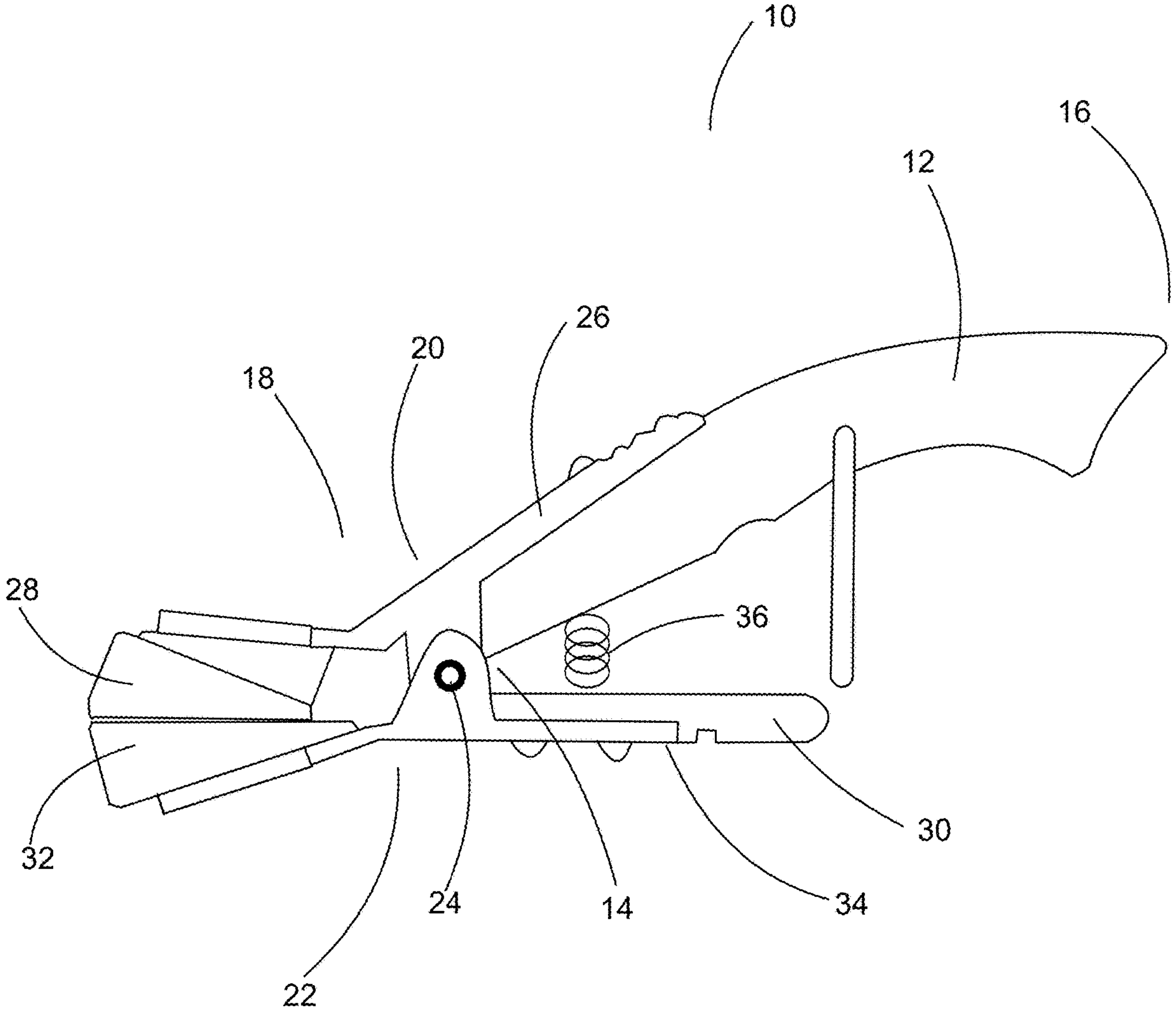
FIG. 2 is a side view of the stencil assembly of FIG. 1.
Figure 3:
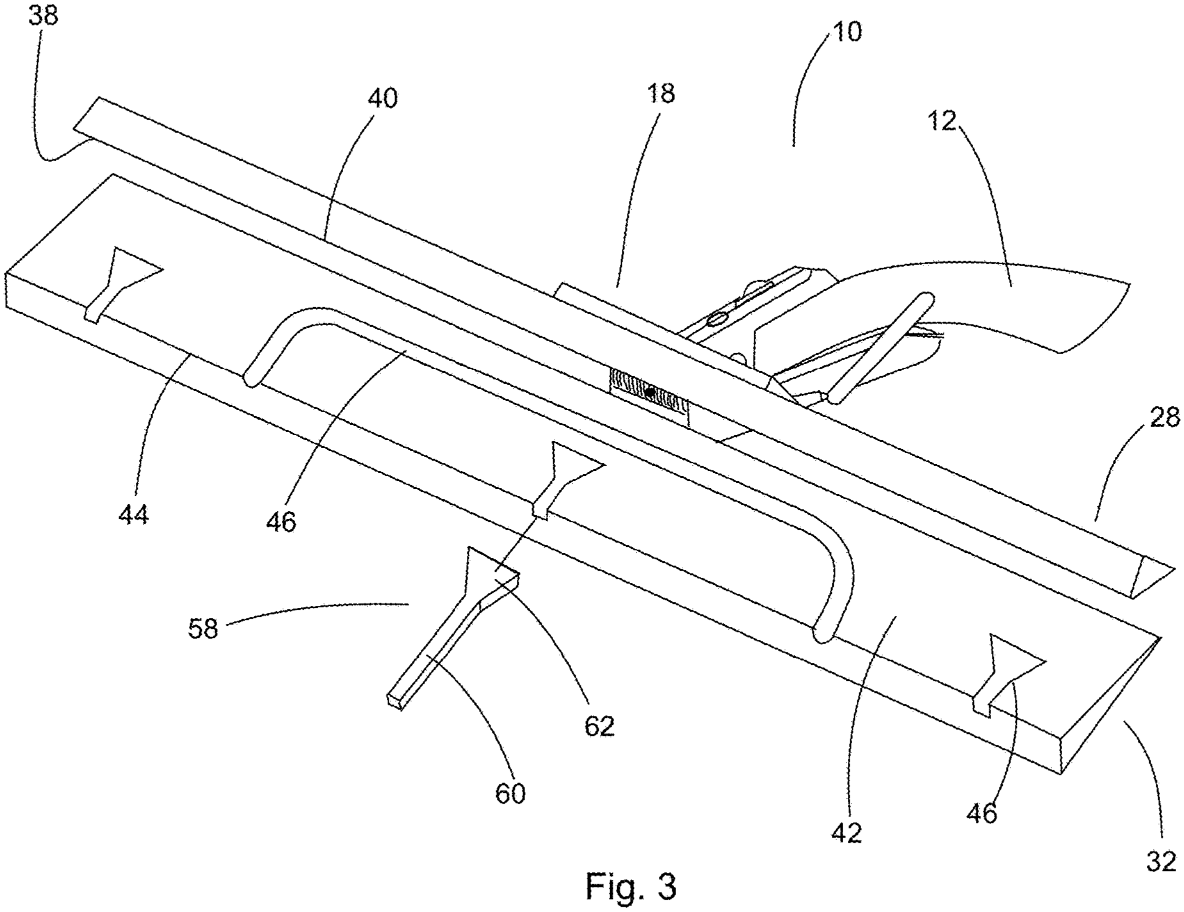
FIG. 3 is a perspective view of the stencil assembly of FIG. 1.

Referring to FIGS. 1 to 3, the stencil assembly 10 in accordance with one embodiment comprises a handle 12 that is adapted to be gripped by a hand of a user. The handle 12 may be generally elongated and curved, as shown in FIG. 2. However, the handle 12 may also take on any suitable elongated shape. The handle 12 comprises first and second handle ends 14, 16.

The stencil assembly 10 further comprises a clamp assembly 18 extending proximate to the second handle end 16. The clamp assembly 18 comprises first and second portions 20, 22 that are pivotally connected together (at connection point 24).

The first portion 20 comprises a first clamp handle 26 and a first clamp member 28 extending from the first clamp handle 26. The second portion 22 comprises a second clamp handle 30 and a second clamp member 32 extending from the second clamp handle 30. The first clamp handle 26 may be fixedly attached to the handle 12. The second clamp handle 30 may comprise a handle surface 34 that is adapted to be pressed by the user.

The clamp assembly 18 further comprises a spring 36 that is connected to the first and second clamp handles 26, 30 and is adapted to bias the first and second clamp members 28, 32 together (i.e. when the clamp assembly 18 in a "closed" configuration, as shown in FIG. 2). When pressure is applied to the handle surface 34 (e.g. from the user pressing on the handle surface 34), the pressure causes the spring 36 to compress, causing the first and second portions 20, 22 to move pivotally at the connection point 24. This in turns causes the first and second clamp members 28, 32 to move apart from each other (i.e. transitioning the clamp assembly 18 into an "open" configuration). When pressure is no longer applied to the handle surface 34 (e.g. from the user no longer pressing on the handle surface 34), the release of pressure on the spring 36 biases the first and second clamp members 28, 32 together, transitioning the clamp assembly 18 back to the "closed" configuration.

Figure 4:
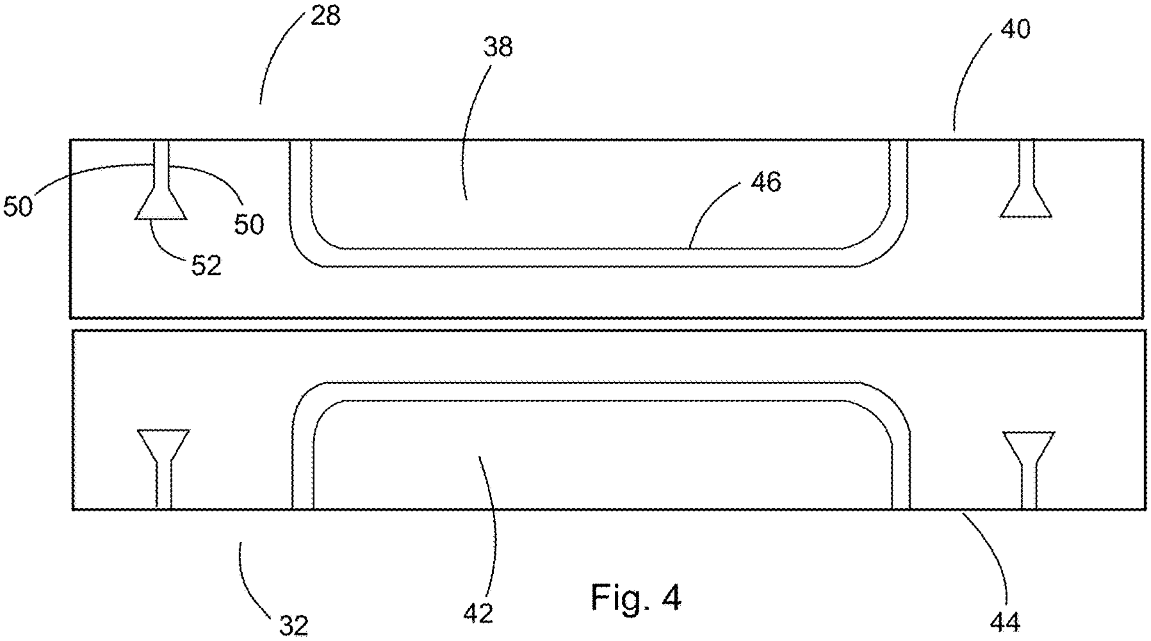
FIG. 4 depicts the first and second clamp members of the stencil assembly.

Referring to FIGS. 3 and 4, the first clamp member 28 may comprise a first clamp surface 38 with a first leading edge 40, while the second clamp member 30 may comprise a second clamp surface 42 with a second leading edge 44. When the clamp assembly 18 is in the "closed" configuration, the first clamp surface 38 and the second clamp surface 42 engage with each other. In some embodiments, one or both of the first and second clamp surfaces 38, 42 comprise one or more grooves 46 extending from the first leading edge 40 and/or the second leading edge 44. Where the grooves 46 are present on both the first and second clamp surfaces 38, 42, the grooves 46 on the first clamp surface 38 may generally correspond with the grooves 46 on the second clamp surface 42 such that when the clamp assembly 18 is in the "closed" configuration, the grooves 46 on the first clamp surface 38 are generally aligned with the grooves 46 on the second clamp surface 42.

When the clamp assembly 18 is in the "closed" configuration, the grooves 46 may form channels 48 extending from the first and second leading edges 40, 44. For example, where the grooves 46 are present on both the first and second clamp surfaces 38, 42, the grooves 46 on the first clamp surface 38 may align with the grooves 46 on the second clamp surface 42 to define, at least in part, the channels 48. Alternatively, in some embodiments, where the grooves 46 are only present on one of the first and second clamp surfaces 38, 42, the channels 48 may be defined by, at least in part, the grooves 46 on one of the first and second clamp surfaces 38, 42 and the other one of the first and second clamp surfaces 38, 42.

In some embodiments, one or more of the channels 48 defined by the grooves 46 may have a diameter or width that are greater at least at some points away from the first and second leading edges 40, 44. For example, in the embodiment shown in FIGS. 3 and 4, a portion of some of the grooves 46 may be defined, at least in part, by a pair of generally parallel groove side walls 50 extending from the first and/or second leading edges 40, 44. The groove side walls 50 may be formed on the first and/or second clamp surfaces 38, 42. However, the grooves 46 may further comprise one or more cutout portions 52. At least a portion of the cutout portions 52 have a width greater than a width between the groove side walls 50. In the embodiment shown in FIGS. 3 and 4, the cutout portions 52 comprise a triangular shape; however, it is understood that other shapes (circles, rectangles, squares, other polygons) are also possible.

Referring again to FIGS. 3 and 4, one or more of the channels 48 defined by the grooves 46 may form a partial path within the first and/or second clamp surfaces 38, 42.

Figure 5:
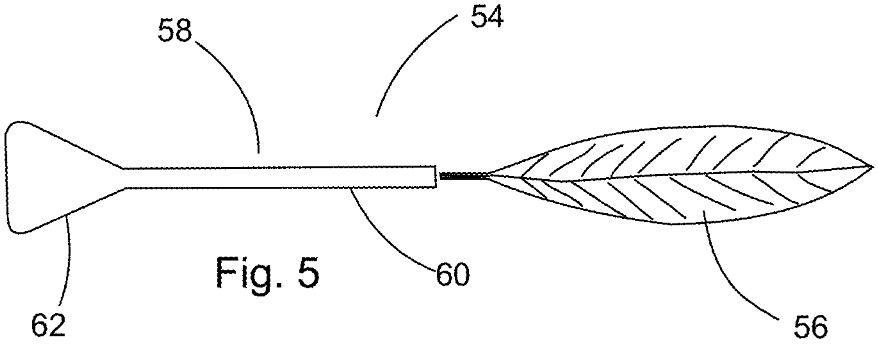
FIG. 5 depicts one embodiment of the stencil attachment.
Figure 6:
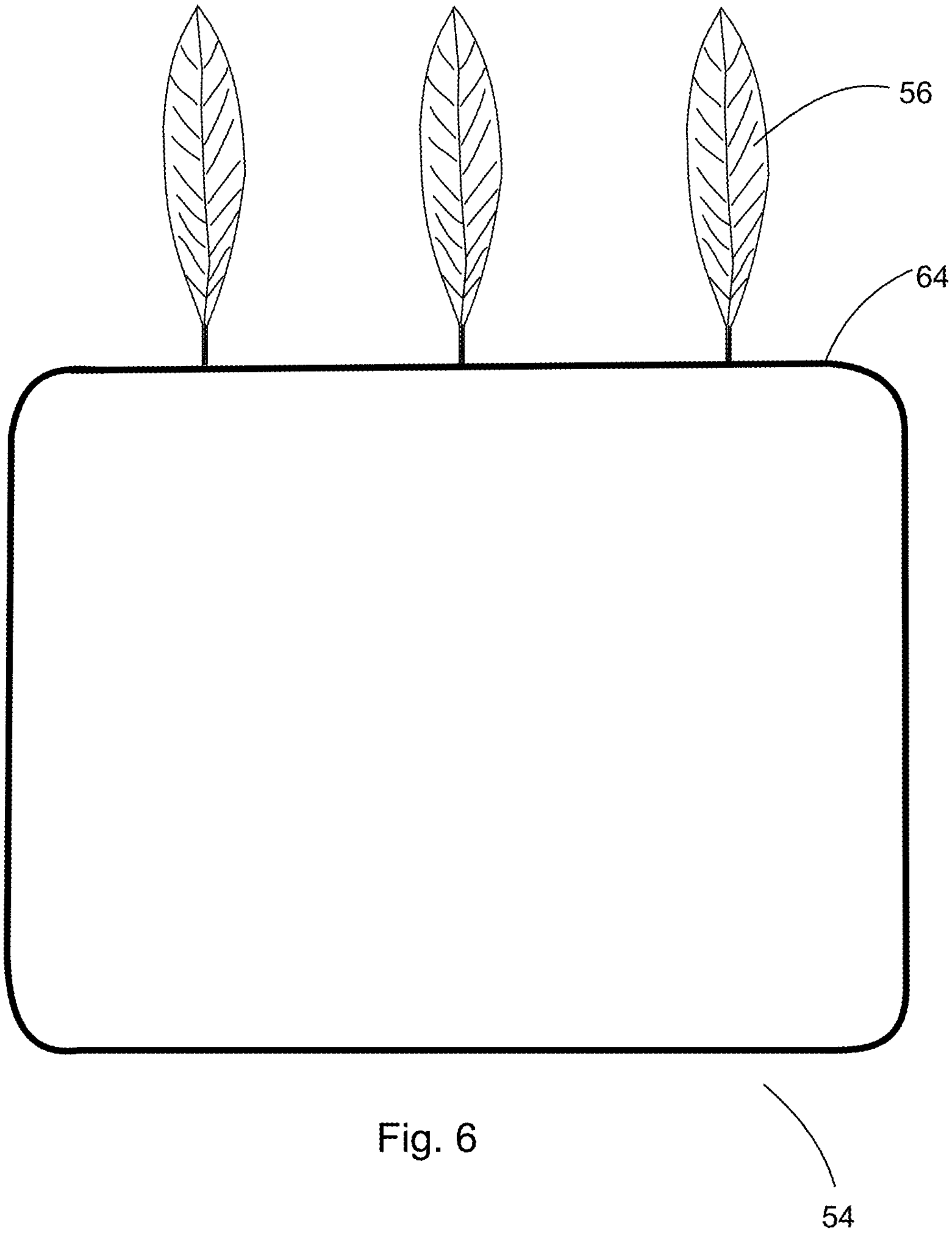
FIG. 6 depicts another embodiment of the stencil attachment.

The stencil assembly 10 further comprises stencil attachments 54 that are adapted to engage with the channels 48. Referring to FIGS. 5 and 6, the stencil attachment 54 comprise a stencil design 56 (depicting a desired pattern or shape) and one or more attachment members 58 extending therefrom. For example, FIG. 5 depicts the stencil design 56 in the shape of a leaf; however, it is understood that other shapes, patterns, or designs are also possible. The attachment members 58 are adapted to fit, at least partially, within the channels 48. Accordingly, the attachment members 58 may have a shape that corresponds generally with the shape of the cutout portions 52. For example, in the embodiment shown in FIG. 5, the attachment member 58 comprises a stem 60 and a head 62. The stem 60 extends between the head 62 and the stencil design 56. The head 62 may have a shape that corresponds to that of the cutout portions 52. For example, in the embodiment shown in FIG. 5, the head 62 has a triangular shape generally corresponding to the shape of the cutout portion 32. One benefit of using a triangular shape is that rotation of the stencil attachment 54 within the channels 48 is prevented.

Other embodiments for the stencil attachments 54 are also possible. For example, referring to FIG. 6, the stencil attachment 54 may comprise a frame 64 onto which the stencil designs 56 may be attached.

Figure 7:
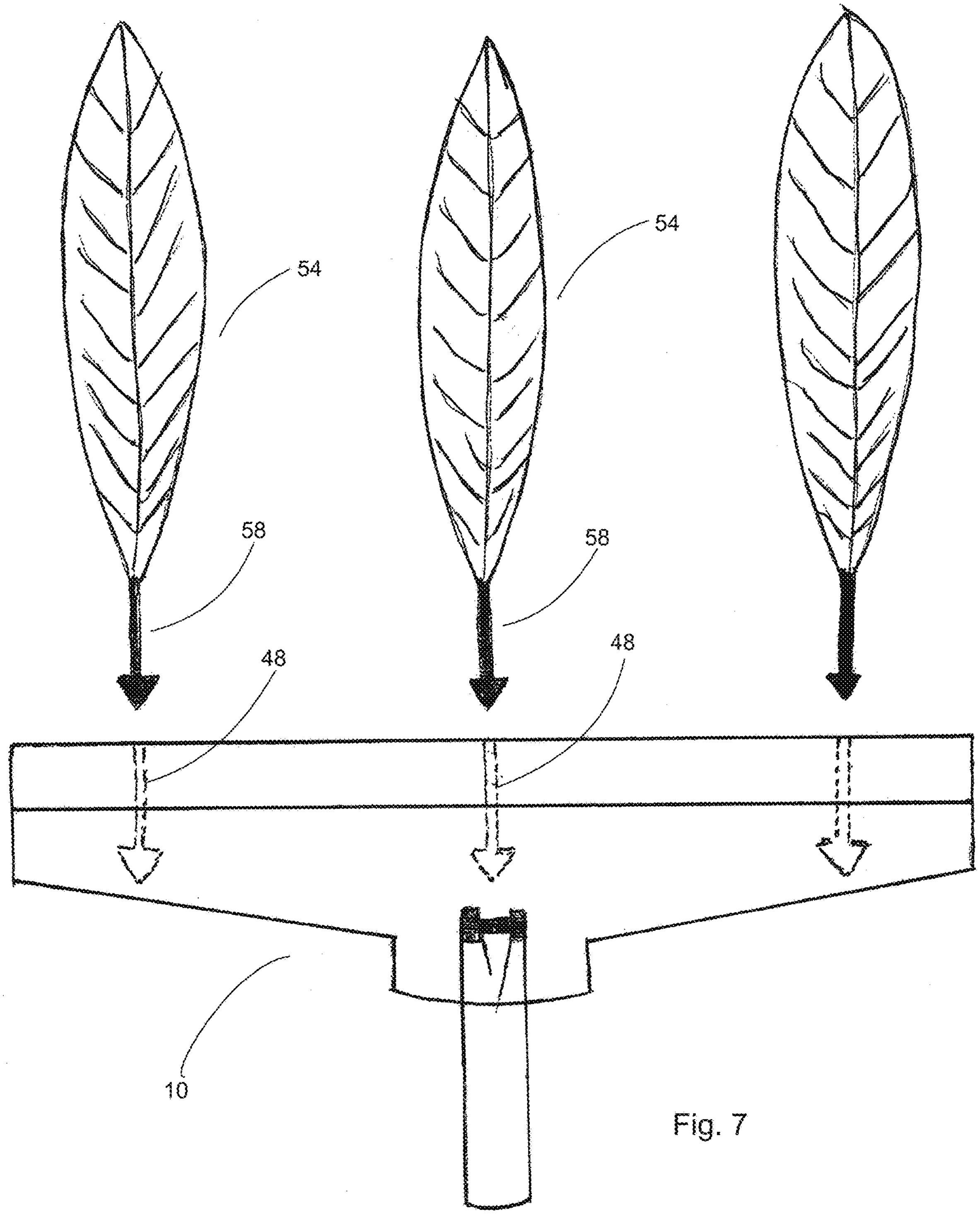
FIG. 7 depicts the stencil assembly in operation.

Referring to FIG. 7, the operation of the stencil assembly 10 will now be described. The stencil assembly 10 initially has the clamp assembly 18 in the "closed" configuration, with no stencil attachments 54 attached to the clamp assembly 14. The user first applies pressure on the handle surface 34. This causes the first and second clamp surfaces 38, 42 to move apart from each other, thereby moving the clamp assembly 18 to the "open" configuration. One or more of the stencil attachments 54 are placed such that the stem 60 and the head 62 are located within the grooves 46, with the head 62 located within the cutout portions 52. The user then releases pressure on the handle surface 34, thereby causing the first and second clamp surfaces 38, 42 to bias towards each other, moving the clamp assembly 18 back to the "closed" configuration. Once the first and second clamp surfaces 38, 42 contact and engage with each other, the channels 48 are formed. Because of the configuration of the channels 48, the stencil attachments 54 are not able to move out of the channels 48 but are instead held in place when clamp assembly 18 is in the "closed" configuration. The user can then grip the handle 12 and place the stencil assembly 10 proximal to the object being painted and apply paint (e.g. through a paint spray, etc.).

In order to remove the stencil attachments 54, the user applies pressure to the handle surface 34, thereby moving the first and second clamp surfaces 38, 42 apart. The stencil attachments 54 can then be removed from the grooves 46.

In addition, stencil attachments 54 of differing sizes and configurations may also be used. For example, some stencil attachments 54 may be individual units, with each of the stencil attachments 54 attached to a single one of the channels 48. In other embodiments, a single one of the stencil attachments 54 may be used, with the frame 64 and multiple ones of the stencil designs 56 extending from the frame 64.

It will be appreciated by those skilled in the art that the preferred embodiment has been described in some detail but that certain modifications may be practiced without departing from the principles of the invention.

The invention claimed is:

1. A stencil assembly comprising:

a handle;

a clamp assembly extending from the handle, the clamp assembly comprising:

a first clamp member comprising a first clamp surface; and a second clamp member comprising a second clamp surface; and one or more stencil attachments, the one or more stencil attachments comprising:

an attachment member adapted to removably engage with the clamp assembly; and a stencil design extending from the attachment member;

wherein one or both of the first and second clamp surfaces comprise grooves;

wherein the first and second clamp members are biased to each other in a closed configuration such that the first and second clamp surfaces engage with each other; and wherein in the closed configuration, the grooves define, at least in part, channels for removably engaging with the one or more stencil attachments.

2. The stencil assembly of claim 1, wherein the clamp assembly further comprises first and second portions, wherein the first portion comprises a first clamp handle and the first clamp member, and wherein the second portion comprises a second clamp handle and the second clamp portion.

3. The stencil assembly of claim 2, wherein the first clamp handle is connected to the handle.

4. The stencil assembly of claim 2, wherein the first and second portions are pivotally connected.

5. The stencil assembly of claim 4, wherein the clamp assembly further comprises a spring for biasing the first and second clamp members to each other.

6. The stencil assembly of claim 5, wherein compression of the spring causes the first and second clamp surfaces to disengage from each other.

7. The stencil assembly of claim 6, wherein the compression of the spring is effected by pressing on the second clamp handle.

8. The stencil assembly of claim 1, wherein the first clamp surface comprises a first leading edge and the second clamp surface comprises a second leading edge, and wherein the grooves extend from one or both of the first and second leading edges.

9. The stencil assembly of claim 8, wherein one or both of the first and second clamp surfaces comprise groove side walls extending from one or both of the first and second leading edges, and wherein the groove side walls define at least a portion of one or more of the grooves.

10. The stencil assembly of claim 9, wherein one or more of the grooves comprise a cutout portion, and wherein at least a portion of the cutout portion having a width greater than a distance between the groove side walls.

* * * * *